United States Patent
Liu et al.

(10) Patent No.: US 9,659,000 B2
(45) Date of Patent: May 23, 2017

(54) MAPPING INFORMATION INTO HYBRID STRUCTURE ENABLING EFFICIENT QUERYING OF THE INFORMATION

(71) Applicant: International Business Machines Corporation, Armonk, NY (US)

(72) Inventors: Pu Liu, Vestal, NY (US); Victor M. Lourenco, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 14/267,350

(22) Filed: May 1, 2014

(65) Prior Publication Data

US 2015/0317298 A1     Nov. 5, 2015

(51) Int. Cl.
G06F 17/30 (2006.01)
G06F 17/27 (2006.01)
G06F 7/36 (2006.01)
G06F 17/22 (2006.01)

(52) U.S. Cl.
CPC ........... *G06F 17/272* (2013.01); *G06F 7/36* (2013.01); *G06F 17/2247* (2013.01); *G06F 17/30914* (2013.01)

(58) Field of Classification Search
None
See application file for complete search history.

(56) References Cited

U.S. PATENT DOCUMENTS

| | | | |
|---|---|---|---|
| 6,721,727 B2 * | 4/2004 | Chau | G06F 17/30917 |
| 8,321,845 B2 | 11/2012 | O'Farrell et al. | |
| 2011/0302198 A1 * | 12/2011 | Baby | G06F 17/30539 707/769 |

FOREIGN PATENT DOCUMENTS

EP    2562663 A2    2/2013

* cited by examiner

*Primary Examiner* — Robert Beausoliel, Jr.
*Assistant Examiner* — Hau H Hoang
(74) *Attorney, Agent, or Firm* — Cantor Colburn LLP; William A. Kinnaman, Jr.

(57) ABSTRACT

A mapping system and method that receives a query identifying an encoded document, reconfigures the encoded document into a hybrid structure by parsing information from the encoded document and mapping the information as elements into the hybrid structure according to attributes of the information, and extracts the elements matching the query from the hybrid structure.

6 Claims, 3 Drawing Sheets

MAPPING INFORMATION INTO HYBRID STRUCTURE ENABLING EFFICIENT QUERYING OF THE INFORMATION

BACKGROUND

The disclosure relates generally to querying and retrieving information, and more specifically, to mapping information into a hybrid structure that supports efficient querying and retrieving of the mapped information.

In general, technology systems utilize a data format for encoding, storing, and organizing information into a data structure. Once formatted into the data structure, the information may then be uniformly transferred between technology systems for data processing, such as data querying and data retrieval. Data processing is typically executed by an application programming interface (API). APIs include specifications for routines, object classes, and variables that enable the data processing, and different specifications are particular to different data processing needs. Yet, while one API may be useful for a particular processing need, that API includes inherent limitations with respect to other data processing needs. Due to these limitations, APIs naturally hinder an ability of any technology system to efficiently and effective query a data structure for information retrieval.

For example, extensible markup language (XML) is a textual data format that defines a set of rules for encoding information and/or other arbitrary data structures. To process information encoded in XML (i.e., XML data) that is stored in an XML document (which may be and/or store data structures), there are generally four API categories: stream oriented processing, such as Simple API for XML (SAX); tree data structure based processing, such as Document Object Model (DOM); binding, such as Java Architecture of XML Binding (JAXB); and declarative transformation processing, such as XML Path Language (XPath). SAX, an event-based sequential access parser that provides a mechanism for sequentially reading on each piece of the XML document, is difficult to use for randomly accessing the XML document. DOM, a convention for representing XML data as a tree data structure, lacks querying mechanisms. Thus, the tree data structure must be recursively traversed to get the XML data. JAXB, which transparently converts XML data to native Java classes, also does not support the querying mechanisms. XPath provides a common syntax to select XML elements by a list of queries and treats XML documents as a tree data structure; however, when selected tree nodes are returned as results, the intermediate tree nodes along a path to the selected tree nodes are omitted.

SUMMARY

According to one embodiment of the present invention, a mapping system and method that receives a query identifying an encoded document, reconfigures the encoded document into a hybrid structure by parsing information from the encoded document and mapping the information as elements into the hybrid structure according to attributes of the information, and extracts the elements matching the query from the hybrid structure.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
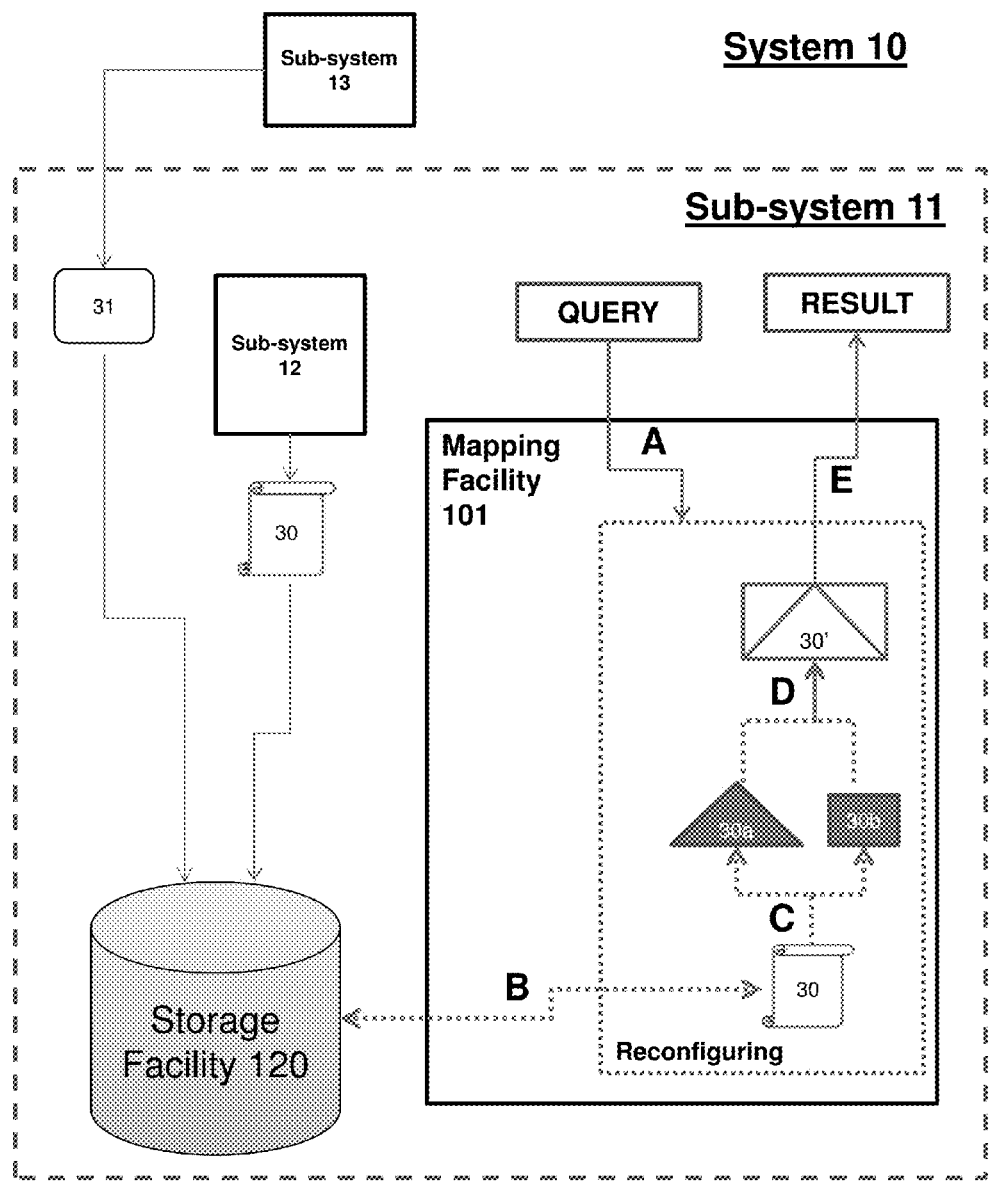
FIG. 1 illustrates a mapping system.

As indicated above, the data processing limitations of APIs (e.g., random access difficulties, lacking querying mechanisms, and omitted intermediate results) hinder a technology system's ability to efficiently and effective query a data structure for information retrieval. Thus, what is needed is a mechanism that maps information into a hybrid structure that supports efficient querying and retrieving of the mapped information.

In general, embodiments of the present invention disclosed herein may include a mapping system, method, and/or computer program product that maps information from a data structure into a hybrid structure to supports efficient querying and retrieving of the mapped information.

For example, the mapping system and method receives a query identifying an encoded document, reconfigures the encoded document into a hybrid structure by parsing information from the encoded document and mapping the information as elements into the hybrid structure according to attributes of the information, and extracts the elements matching the query from the hybrid structure.

Systems and/or computing devices, such as the mapping system (e.g., system 10, sub-systems 11-13, and facilities 101, 120 of FIG. 1 and computing device 201 of FIG. 2 below), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

In general, computing devices may include a processor (e.g., a processor 202 of FIG. 2) and a computer readable storage medium (e.g., a memory 204 of FIG. 2), where the processor receives computer readable program instructions, e.g., from the computer readable storage medium, and executes these instructions, thereby performing one or more processes, including one or more of the processes described herein (e.g., mapping process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the mapping system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the mapping system and method.

FIG. 1 illustrates the mapping system 10 comprising sub-systems 11-13, a mapping facility 101, storage facility 120, where the mapping facility 101 maps information into a hybrid structure (e.g., a tree-table object as further described below) that supports efficient querying and retrieving of the mapped information. The mapping system 10 and the sub-systems 11-13 may be any may include and/or employ any number and combination of computing devices and networks utilizing various communication technologies, as described above, that enable the mapping facility 101 to query and retrieve information. In operation, the storage facility 120 of the sub-system 11 collects information from the sub-systems 12-13. Further, in response to receiving a query (arrow A), the mapping facility 101 performs a mapping process that includes reconfiguring (as represented by the dotted-box and the dotted-lines B through D) and extracting (arrow E) the collected information to produce a result (e.g., the information that is the target of the query).

The information may be any collection of data stored in a data structure. A data structure (e.g., a data structure 30 and a data structure 31) is a mechanism of electronically storing and organizing information and/or managing large amounts of information. Thus, the data structure 30 and the data structure 31 are illustrative of documents that may be and/or store data structures. Examples of data structure types include, but are not limited to, arrays, which store a number of elements in a specific order; records, which are values that contains other values; hash tables, which are dictionaries in which name-value pairs can be added and deleted; sets, which are abstract data structures that store specific values without any particular order and repeated values; graphs and trees, which are linked abstract data structures composed of nodes, where each node contains a value and also one or more pointers to other nodes; and objects, which contain data fields and program code fragments for accessing or modifying those fields. For instance, an XML document may include information stored and organized in hash table, where the information is considered XML data and the hash table is considered the data structure, while the XML document itself may also be considered a data structure.

The query, in general, is an information retrieval activity of obtaining information resources relevant to an information need from a collection of information resources (e.g., the storage facility 120). Information retrieval activity initiates searches based on metadata, full-text indexing, and/or other content-based initiators. Thus, for example, the query (arrow A) may initiate or cause the mapping facility 101 to perform a mapping process. Further, a query may be received and/or generated in response to a user input indicating a search for information.

The result, in general, is a notification mechanism for delivering and/or identifying information targeted by the query (or non-existence of the information) to the users responsible for the system 11. Examples of notification mechanisms may include, but are not limited to, text messaging (e.g., SMS), audio alerts (e.g., telephone calls, cell-phone calls, VoIP calls, voicemails, loudspeaker announcements, etc.), electronic mail (e.g., POP, IMAP, SMTP), desktop alerts (e.g., dialog, balloon, modal window, toast, etc.), pager (e.g., SNPP), instant messaging (e.g., IRC, ICQ, AIM, Yahoo! Messenger, MSN, XMPP, iMessage), and the like.

The mapping facility 101 may include a computing device with a processor and a memory configured to receive and respond to a query for information. In operation, for example, in response to and in accordance with the query (arrow A), the mapping facility 101 acquires (arrow B) the data structure 30 from the storage facility 120; parses (arrow C) information from the data structure 30 into a plurality of data elements, as represented by element 30*a* and element 30*b*; and maps (arrow D) the plurality of data elements into a hybrid structure 30'. Next, the mapping facility 101 (arrow E) examines the hybrid structure 30' by recursively trimming nodes that do not meet a matching criteria based on the query and extracts the plurality of data elements from the remaining nodes for presentation as the result.

The storage facility 120 may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage facility 120 may generally be included within a computing device employing a computer operating system such as one of those mentioned above, and are accessed via a network in any one or more of a variety of manners. The storage facility 120 may be a part of the sub-system 11 (as illustrated in FIG. 1), run independently within the same device or system as the mapping facility 110 (as illustrated in FIG. 2), or be an external to and in communication with the record mapping facility 101. In operation, for example, the storage facility 120 may collect and archive the data structure 30 received from sub-system 12. The storage facility 120 may further communicate with other systems that may be internal or external to sub-system 11 to collect and archive data (such as receiving the data structure 31 from the sub-system 13).

The system 10 and elements therein may take many different forms and include multiple and/or alternate components and facilities. While an exemplary system 10 is shown in FIG. 1, the exemplary components illustrated in FIG. 1 are not intended to be limiting. Indeed, additional or alternative components and/or implementations may be used.

Figure 2:
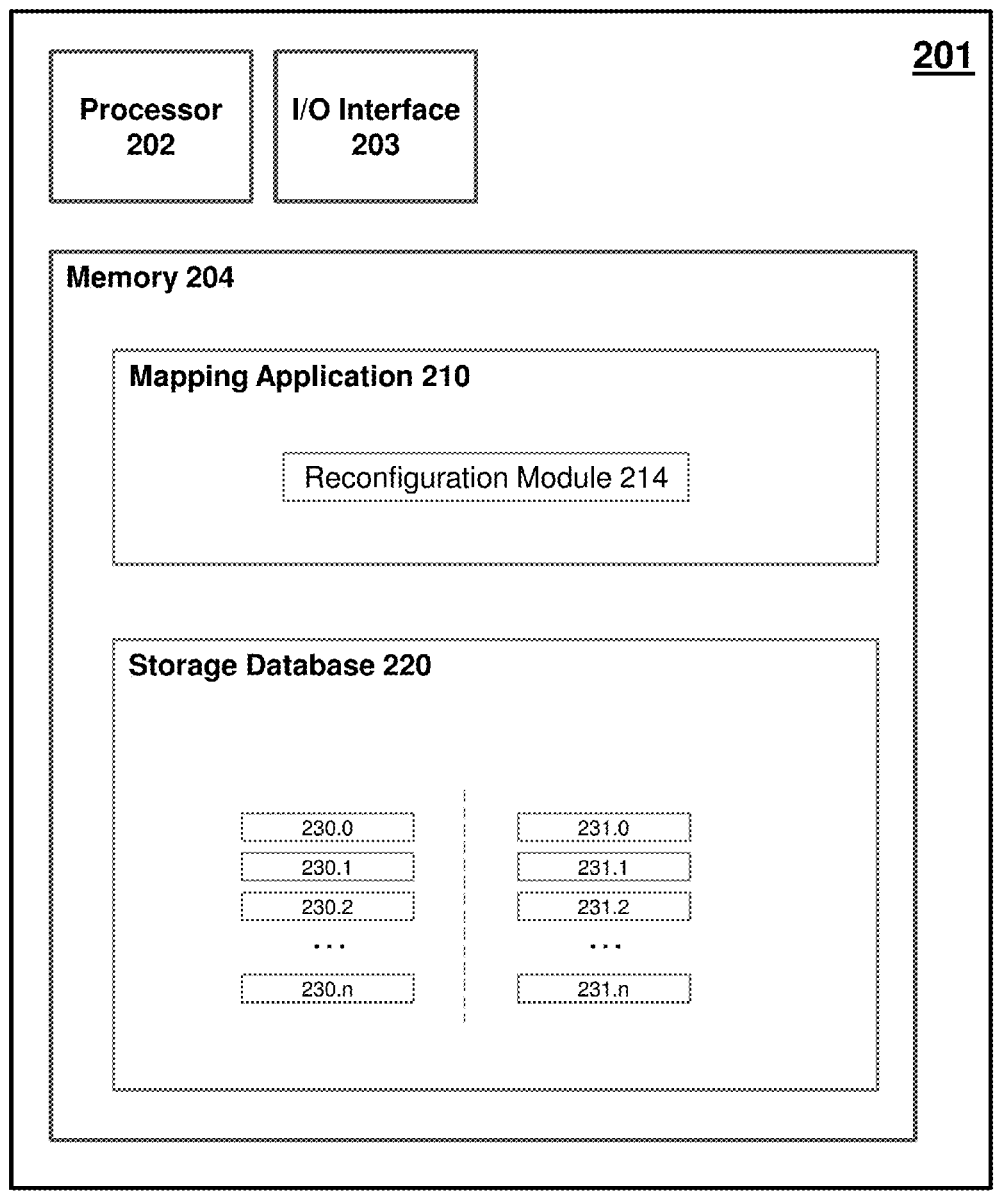
FIG. 2 illustrates a computing device schematic configured to provide a mapping application.

FIG. 2 illustrates a computing device 201 (e.g., a computing device as described above) configured to provide a mapping process that includes a processor 202, an input/output interface 203, and a memory 204. The processor 202 may receive computer readable program instructions from the memory 204 and execute these instructions, thereby performing one or more processes defined by a mapping application 210.

The processor 202 may include any processing hardware, software, or combination of hardware and software utilized by the computing device 201 that carries out the computer readable program instructions by performing arithmetical, logical, and/or input/output operations. Examples of the processor 202 include, but are not limited to an arithmetic logic unit, which performs arithmetic and logical operations; a control unit, which extracts, decodes, and executes instructions from a memory; and an array unit, which utilizes multiple parallel computing elements.

The input/output (I/O) interface 203 may include a physical and/or virtual mechanism utilized by the computing device 201 to communicate between elements internal and/or external to the computing device 201. That is, the I/O interface 203 may be configured to receive or send signals or data within or for the computing system 200. An example of the I/O interface 203 may include a network adapter card or network interface configured to receive computer readable program instructions from a network and forward the computer readable program instructions, original records, or the like for storage in a computer readable storage medium (e.g., memory 204) within the respective computing/processing device (e.g., computing device 201).

The memory 204 may include a tangible device that retains and stores computer readable program instructions, as provided by the mapping application 210, for use by the processor 202 of the computing device 201.

The mapping application 210 may include computer readable program instructions configured to receive and respond to a query for information by acquiring data structures 203 from a storage facility 120 (as further described below). The application 210 includes and is configured to utilize a reconfiguration module 214 to parse the information of the data structures 203 into data elements and map the data elements into a hybrid structure, such as a tree-table object. The application 210 is configured to examine the tree-table object by recursively trimming nodes that do not meet a matching criteria based on the query and extracts the data elements from the remaining nodes to produce a result, i.e., the information targeted by the query.

The reconfiguration module 214 may include computer readable program instructions configured to create a hybrid structure, parse information from the data structure (e.g., blocks 230, 231 as described below), and map the parsed information into the hybrid structure. A hybrid structure is a strong or enhanced data structure type that includes a combination of qualities from at least two different data structures types.

For instance, under the XML format, information of the data structure may be XML data of an XML document, respectively. In turn, the hybrid structure is a tree-table object that includes a combination of qualities from a binding data structure type, such as JAXB, and a declarative transformation processing data structure type, such as)(Path. In operation, reconfiguration module 214 XML creates the tree-table object, parses XML data from the XML document, and maps the parsed XML data into columns and rows of the tree-table object according to attributes of the XML data. Thus, when the application 210 examines the tree-table object, the tree-table inherently supports selecting XML elements from nodes of the tree-table object by a list of queries and additionally stores the XML elements in a subsequent tree-table object with all the intermediate nodes along a path, so that the subsequent object can be queried again with unnecessary nodes trimmed (i.e., recursively trimming the tree-table object of nodes that do not match the query). This mapping, processing, and re-mapping may be repeated until the desired XML data (or non-existence of XML data) is retrieved or the desired nodes are selected. The selected tree nodes along with their attributes (e.g., the associated XML data) are returned as results. The mapping application 210, thus, provides an object oriented interface for programmers to access (i.e., parse and map) XML documents in a native language and supports querying the tree-table object via recursive trimming. In addition, the application 210 enables the tree-table object to be reused for further query as a cached object—especially in a use case when information of a node needs to be retrieved from an intermediary node after a child node has already been identified.

While single items are illustrated for the application 210 (and other items) by FIG. 2, these representations are not intended to be limiting and thus, the application 210 items may represent a plurality of applications. For example, multiple mapping applications in different locations may be utilized to access the collected information, and in turn those same applications may be used for on-demand data retrieval. In addition, although one modular breakdown of the application 210 is offered, it should be understood that the same operability may be provided using fewer, greater, or differently named modules. Although it is not specifically illustrated in the figures, the applications 210 may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 220 may include a database, as described above, capable of storing data structures 230, 231. The storage database 220 is in communication with the application 210 of and/or applications external to the computing device 201, such that information, data structures, and documents including data structures may be collected and archived in support of the processes described herein (e.g., mapping process). As illustrated in FIG. 2, the storage database 220 includes a plurality of data structures 230, 231, illustrated as data structure 230.0 to data structure 230.n and data structure 231.0 to data structure 231.n, where 'n' is an integer representing a number structures archived by the storage database 220. Although one exemplary numbering sequence for the records of the storage database 220 is offered, it should be understood that the same operability may be provided using fewer, greater, or differently implemented sequences.

Figure 3:
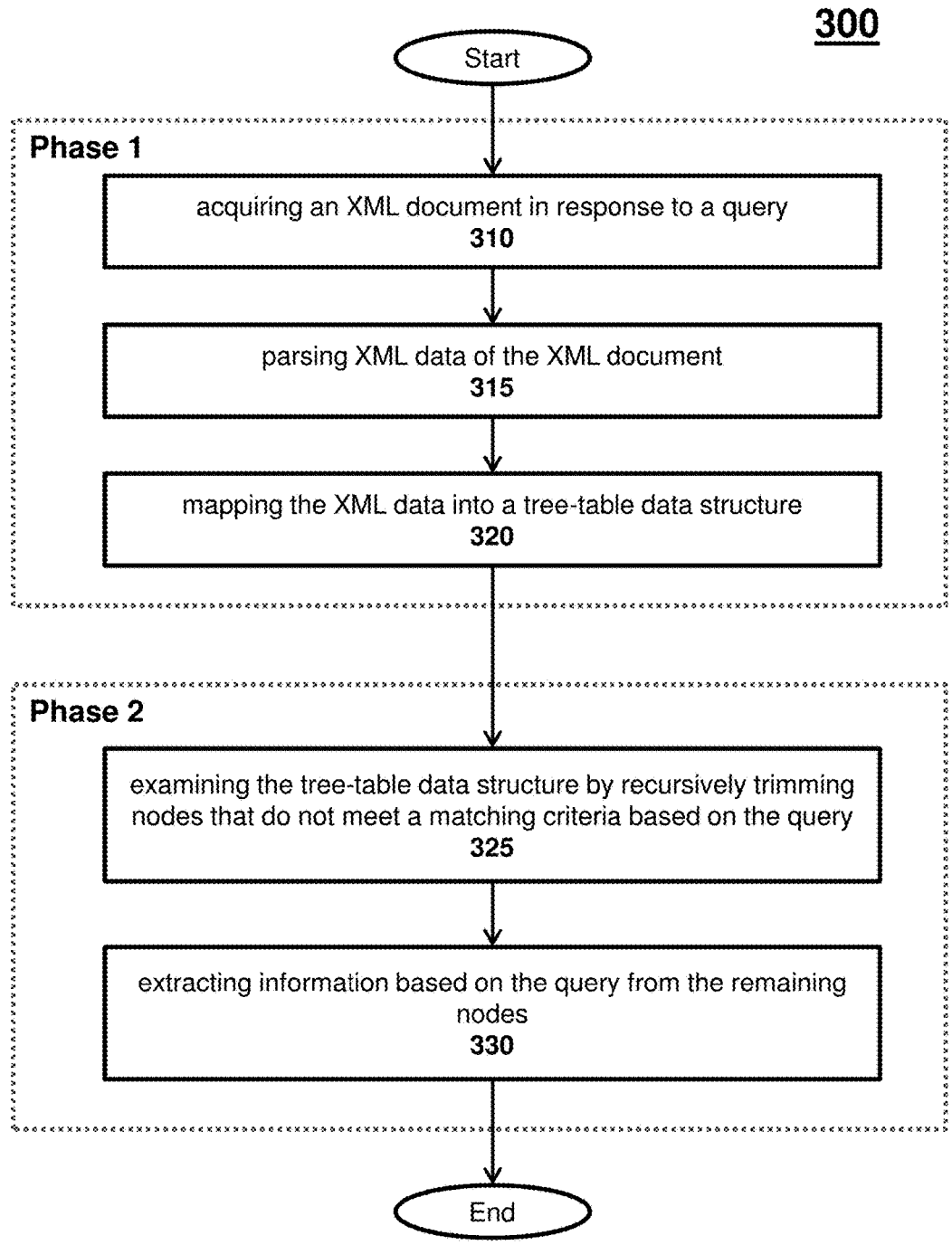
FIG. 3 illustrates a process flow of a mapping system.

The application 210 will be described with reference to FIG. 3 and in view of the XML example above. FIG. 3 illustrates a process flow 300 of the mapping system. The process 300 illustrates a set of operation blocks divided between two phase blocks (e.g., phase 1 and phase 2) that correspond to arrows B-E of FIG. 1 and that are not limiting an order or grouping of operation blocks. In fact, the operation blocks may be executed in sequence, concurrently, or the operation blocks may sometimes be executed in the reverse order, depending upon the operability involved. As illustrated, phase 1 includes block 310, block 315, and block 320, which correspond to a reconfiguring operation by the management facility 101, e.g., respectively: the acquiring operation associated with arrow B, the parsing operation of arrow C, and the mapping operation of arrow D. Phase 2 includes block 325 and block 330, which correspond to an extracting operation by the management facility 101, e.g., respectively: the examining and extracting operations of arrow E.

The process 300 begins at block 310 when, in response to and in accordance with the query (arrow A), the reconfiguration module 214 of the mapping application 210 acquires (arrow B) the data structure 230 in response to a query. For example, the application 210 acquires an XML document from the storage database 220 and creates an tree-table object called 'iqyvse_XMLTable_Element.' An example of the XML document is as follows:

```
<?xml version="1.0" encoding="utf-8"?>
<sys_info value="2827">
    <machine_model value="H20">
        <num_of_cecdrawers>0x01</num_of_cecdrawers>
        <physical_pus>0x1B</physical_pus>
        <liccc_enabled_pus>0x14</liccc_enabled_pus>
        <kneecap_id value="0x57">
            <num_cps>0x14</num_cps>
            <soft_model>700</soft_model>
            <rcci_key>700</rcci_key>
        </kneecap_id>
        <kneecap_id value="0x56">
            <num_cps>0x14</num_cps>
            <soft_model>600</soft_model>
            <rcci_key>600</rcci_key>
        </kneecap_id>
```

At block 315, the application 210 parses (arrow C) information from the data structure 230 into a plurality of data elements (e.g., the application 210 parses the XML data of the XML document by BOOST ptree). The process then proceeds to block 320, where the application 210 maps (arrow D) the plurality of data elements into the tree-table object (e.g., the XML data of the XML document is stored in the iqyvse_XMLTable_Element, which includes a list of attributes, a list of single children, a list of a collection of children, etc. An example of the iqyvse_XMLTable_Element is illustrated via Table 1:

TABLE 1

| | | | | kneecap | | | |
|---|---|---|---|---|---|---|---|
| Mach model | # cec drawers | PUs | Liccc PUs | id | # cps | soft model | rcci key |
| H20 | 0x01 | 0x1B | 0x14 | 0x57 | 0x14 | 700 | 700 |
|  |  |  |  | 0x56 | 0x14 | 600 | 600 |
| H43 | 0x02 | 0x36 | 0x2B | 0x57 | 0x2B | 700 | 700 |
|  |  |  |  | 0x56 | 0x2B | 600 | 600 |
| H66 | 0x03 | 0x51 | 0x42 | 0x57 | 0x42 | 700 | 700 |
|  |  |  |  | 0x56 | 0x42 | 600 | 600 |

At block 325, the application 210 examines the tree-table data structure by recursively trimming nodes that do not meet a matching criteria based on the query, so that the untrimmed or remaining nodes are 'selected' by the application 210. For example, a method matchQuery( ) may be utilized on iqyvse_XMLTable_Element to accept a list of query objects and trim the nodes which do not meet the criteria. The query is examined recursively to all children nodes. The process then proceeds to block 330, where the application 210 extracts information based on the query from the remaining nodes. Users can use getValue( ) to retrieve the information from the iqyvse_XMLTable_Element. An example of the query is as follows:

```
HCON_XMLTable_Request_Query query;
query.add("machine_model","value","H89");
query.add("num_of_cecdrawers","0x04");
query.add("kneecap_id","value","0x56");
try
{
    HCON_XMLTable_Element queryResult =
        HCON_XMLTable_Mgr::getInstance( ).get_element
            ("sys_info","2827", query);
    . . .
```

As an alternative example, when the query is based on a concrete C++ class, the application 210 creates the iqyvse_xmltable_element and then creates the C++ object by querying the iqyvse_xmltable_element based on business logic. Users can access the C++ class or the associated iqyvse_xmltable_element and attributes (e.g., sys_info, memory, rcci_info, liccc_less, etc.). Thus, even when converting from an existing C array structure to XML, table query semantics are preserved as the rows and columns are kept for further query so that an order of queries constructs a path to an XML node (e.g., the query is equivalent to selecting the column from the table).

Then, the process 300 ends.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
receiving, by a processor, a query identifying an encoded document;
reconfiguring the encoded document into a hybrid structure by:
acquiring the encoded document,
parsing information from the encoded document, and
mapping the information according to attributes of the information as elements into the hybrid structure comprising a tree-table object to support recursively trimming of nodes of the tree-table object and extracting of the information by in a subsequent hybrid structure with all intermediate nodes along a path of the query to provide any subsequent object that is queried again with unnecessary nodes trimmed; and
extracting the elements matching the query from the hybrid structure by:
recursively trimming the nodes of the hybrid structure and the subsequent hybrid structure that do not match the query to produce a set of remaining nodes, and
extracting information based on the query from the set of remaining nodes in response to completing the recursive trimming,
wherein the mapping of the information includes mapping the information as the elements into columns and rows of the tree-table object according to the attributes of the information, wherein the encoded document is encoded according to an extensible markup language and the information is extensible markup language data.

2. The method of claim 1, wherein the mapping of the information includes mapping the information as the elements into nodes of the hybrid structure according to the attributes of the information.

3. A computer program product, the computer program product comprising a computer readable storage medium having program instructions embodied therewith, the program instructions executable by a processor to cause:
   receiving, by the processor, a query identifying an encoded document;
   reconfiguring, by the processor, the encoded document into a hybrid structure by;
      acquiring the encoded document;
      parsing information from the encoded document, and
      mapping the information according to attributes of the information as elements into the hybrid structure comprising a tree-table object to support recursively trimming of nodes of the tree-table object and extracting of the information by selecting the elements from nodes of the tree-table object and storing the elements in a subsequent hybrid structure with all intermediate nodes along a path of the query to provide any subsequent object that is queried again with unnecessary nodes trimmed; and
   extracting, by the processor, the elements matching the query from the hybrid structure by:
      recursively trimming the nodes of the hybrid structure and the subsequent hybrid structure that do not match the query to produce a set of remaining nodes, and
      extracting information based on the query from the set of remaining nodes in response to completing the recursive trimming,
      wherein the mapping of the information includes mapping the information as the elements into columns and rows of the tree-table object according to the attributes of the information,
      wherein the encoded document is encoded according to an extensible markup language and the information is extensible markup language data.

4. The computer program product of claim 3, wherein the mapping of the information includes mapping the information as the elements into nodes of the hybrid structure according to the attributes of the information.

5. A system, comprising a processor and a memory, the system configured to:
   receive a query identifying an encoded document;
   reconfigure the encoded document into a hybrid structure, wherein the reconfiguration includes:
      acquire the encoded document,
      parse information from the encoded document, and
      map the information according to attributes of the information as elements into the hybrid structure comprising a tree-table object to support recursively trimming of nodes of the tree-table object and extracting of the information by selecting the elements from nodes of the tree-table object and storing the elements in a subsequent hybrid structure with all intermediate nodes along a path of the query to provide any subsequent object that is queried again with unnecessary nodes trimmed; and
   extract the elements that match the query from the hybrid structure, wherein the extraction includes:
      recursively trimming the nodes of the hybrid structure and the subsequent hybrid structure that do not match the query to produce a set of remaining nodes, and
      extract information based on the query from the set of remaining nodes in response to completing the recursive trimming,
      wherein the mapping of the information includes mapping the information as the elements into the columns and rows of the tree-table object according to the attributes of the information,
      wherein the encoded document is encoded according to an extensible markup language and the information is extensible markup language data.

6. The system of claim 5, wherein the information is mapped as the elements into nodes of the hybrid structure according to the attributes of the information.

* * * * *